UNITED STATES PATENT OFFICE.

HIRAM O. BROWN, OF CASTLETON, VERMONT.

IMPROVEMENT IN COMPOSITION DRESSINGS FOR ROOFS.

Specification forming part of Letters Patent No. 139,864, dated June 17, 1873; application filed September 30, 1872.

*To all whom it may concern:*

Be it known that I, HIRAM O. BROWN, of Castleton, State of Vermont, have invented a new and Improved Non-Conducting Composition Dressing for roofs of buildings, interior of refrigerators, wood, steam chambers or boxes, and the like; and I do hereby declare that the following is a description thereof.

This invention relates to a new and improved composition for dressing the outside, or inside, or both surfaces of wood used to form the bodies of such articles as buildings, roofs, and sides, refrigerators, steam-boxes, attic-floors, and similar surfaces which it is desirable to make air, steam, or water tight, and non-conducting to heat, and consists in the following-named ingredients, mixed and applied in a manner as follows:

The composition is composed of powdered slate, of about fifty (50) parts; sand, fifty (50) parts, and magnesian cement fifteen (15) parts, for most purposes where the composition is desired to have a fine appearance; but when the appearance is not of material consideration, and utility is only sought to be obtained, the quantity of powdered slate may be lessened and that of the sand increased.

The above-mentioned ingredients are first thoroughly mixed while in a dry state, by any proper mechanical means, after which a sufficient quantity of bittern-water, silicate of soda, or any other of the known equivalent liquid solutions which will act with the slate, sand, and magnesium cement to reunite the particles of the same and cause them to solidify, is then poured in and well mixed with the said ingredients to render the composition semi-fluid, so as to be flowed or run on the surfaces to be dressed as might be required on flat roofs, the inner walls and top and floor surfaces of refrigerators to give a smooth appearance to the same, in which the said surfaces should be made to have a horizontal position in every direction, that the composition will spread out in all directions in an even manner, and with a uniform depth; or a less quantity of the solution may be used so that its fluidity will be reduced to about the consistency of plasterer's mortar, so as to be capable of being spread over the surface to be dressed, by the means of a trowel or other equivalent tool, as may be required in the case of dressing a pitch-roof, or the perpendicular sides of a building, or a steam-chamber, or other similar surfaces out of a horizontal position.

When this composition is to be applied to surfaces having an inclination of more than twenty degrees, I drive into the wood to be dressed a sufficient number of flat-headed nails, at intervals of from four to eight inches, leaving them to project above the surface about one-eighth of an inch, more or less, which nails are to serve as holding-pins, and will become embedded in the composition, to retain the same when dry in close contact with the surface of the wood so dressed, and will prevent it from shifting its position.

This composition is to be made to have a thickness or depth of about from one-fourth to three-eighths of an inch, more or less, according to the nature of the service the composition is intended to perform.

Whether this composition is applied to large or small surfaces, such as roofs or floors, or to the walls and floors of boxes or chambers, it is intended to have the same made continuous, so as to be without joint, crack, or seam, so as to be as if of one piece, and solid at the angles of intersection.

By my improved composition, and its mode of application, any surfaces required to be rendered water, steam, or air tight and capable of preventing the radiation or absorption of heat can be so rendered in an expeditious and economical manner.

Having described my invention, what I claim, and desire to secure by Letters Patent, is—

The non-conducting composition dressing for surfaces of wood, composed of the above-named ingredients, mixed and proportioned and applied in the manner substantially as set forth, for the purposes specified.

H. O. BROWN.

Witnesses:
 CORS. VAN DERZEE,
 CHAS. J. SELKIRK.